Figure 1:
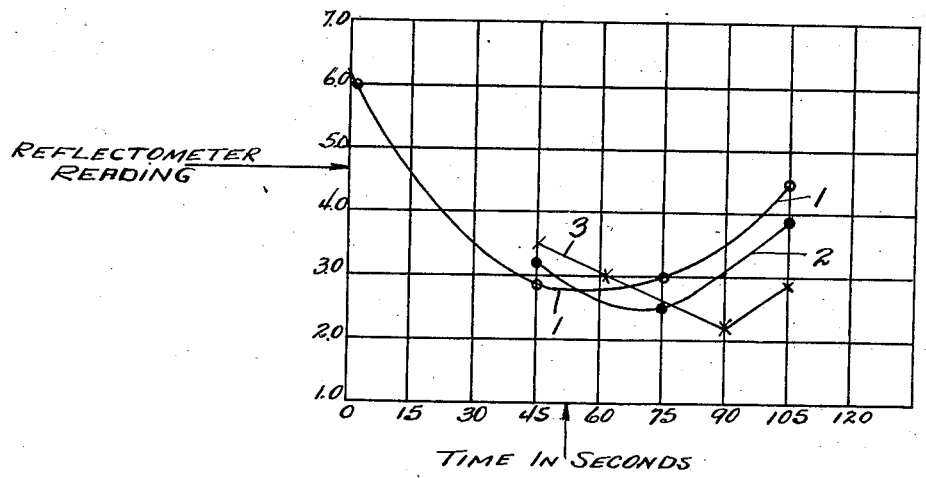

May 16, 1944.  F. W. ADAMS  2,348,704

TREATMENT OF GLASS SURFACES

Filed Sept. 21, 1940

INVENTOR
FREDERICK W. ADAMS

BY Olew E. Bee
ATTORNEY.

Patented May 16, 1944

2,348,704

UNITED STATES PATENT OFFICE 2,348,704

TREATMENT OF GLASS SURFACES

Frederick W. Adams, Pittsburgh, Pa., assignor to Pittsburgh Plate Glass Company, Allegheny County, Pa., a corporation of Pennsylvania Application September 21, 1940, Serial No. 357,707

4 Claims. (Cl. 88—1)

The present invention relates to processes of treating surfaces of glass for purposes of reducing reflection therefrom and to the resultant product.

One object of the invention is to provide glass surfaces having but little reflection and which can be subjected to substantial wear and usage without destroying the non-reflective properties thereof.

The reflection of light from surfaces of glass, particularly of glasses which have been polished is often objectionable because it seriously impairs vision through the glass and produces disturbances in the operation of optical instruments, such as cameras and the like.

It has previously been proposed to reduce reflection from glass surfaces by applying thereto a film of organic material, such as calcium stearate or the like having an index of refraction with respect to air intermediate its index, with respect to glass. If the thickness of the film corresponds to one quarter of the wave length of light, interference between the component of light reflected from the surface of the glass and that reflected from the surface of the film results and the reflected light is extinguished. However, by such process it is impossible to obtain permanently non-reflective surfaces because the organic films are very soft and any mechanical contact with solid bodies mars or destroys them.

It has also been proposed to reduce reflection from glass surfaces by treating the surfaces with acids designed to produce thin films on the surface of such thickness as to set up interference between components of light reflected from exposed surfaces of the film and the surface of the glass covered by the film. This type of film is relatively hard and will withstand considerable wear and usage without destruction. However, it has heretofore been impossible to obtain films having indices of refraction, such as to obtain a reflection from the exposed surface approximately corresponding to the reflection from the glass beneath the film.

In accordance with the provisions of the present invention the foregoing difficulties are to a substantial degree obviated by first treating the surface of a body of glass, such as a glass plate, optical lens or prism, with an acid agent designed to dissolve alkali, barium, lead and such like components from the glass and subsequently treating the resultant film with hydrofluoric acid. The agent dissolves out much of the alkali, alkali earth, lead and the like compounds which are recognized to constitute the base components of glass in which the silica constitutes the acidic component to leave a porous skeleton of silica. The hydrofluoric acid enters the pores of this skeleton and enlarges them to a substantial degree.

Figure 2:
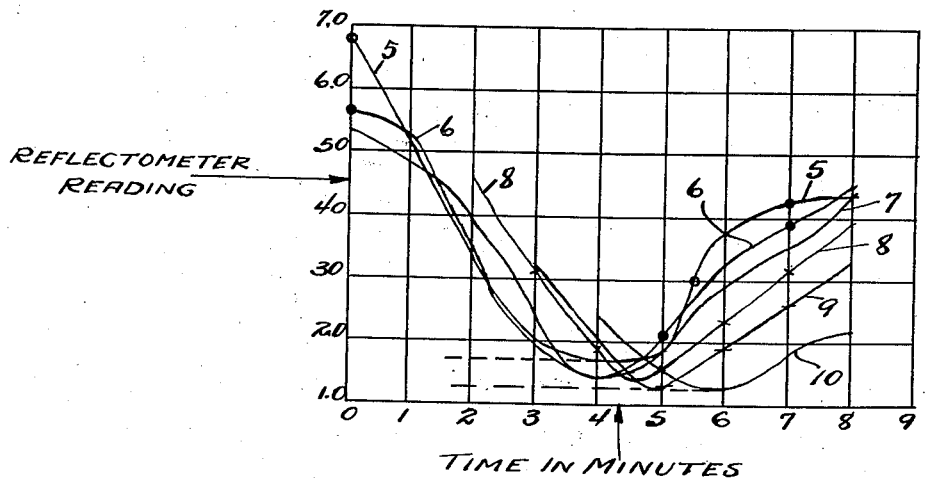

In the drawing the Figures 1 and 2 are curves illustrating the changes in reflectance of glass surfaces resulting from treating the glass with strong mineral acid for different periods of time.

In the practice of the invention the glass, for example a conventional barium, crown glass, is first treated with nitric acid of appropriate concentration, e. g. about .5 normal, in order to form a film consisting largely of porous silica. This treatment may be conducted at a temperature of about 35° C. However, neither the concentration nor the temperature of treatment is particularly critical. The growth of the film is indicated by the appearance of a coloration of the glass surface. Reflection from the surface is at a minimum when the surface assumes a bluish indigo coloration. At this coloration most of the D sodium ray, to which the eye is most highly sensitive, is removed. The color results when the film is a quarter wave length for the color in thickness. Preferably the treatment with nitric acid is continued for a substantial period after the appearance of this color. The treatment with this acid is then discontinued and the body is subjected to treatment for a short period with hydrofluoric acid in dilute form. Usually the treatment with the latter acid should be continued for a period of about 30 seconds to 5 minutes in the case of a barium crown glass, known as barium crown. Excellent results were obtained by treating the glass with .5 normal nitric acid for a period of 90 seconds and then further treating it with hydrofluoric acid for a period of 60 seconds. A glass comprising about:

| | Per cent |
|---|---|
| $SiO_2$ | 40 |
| BaO | 30 |
| PbO | 7 |
| $B_2O_3$ | 5 |
| Alkali and alkali earth metal oxides | 11 |
| Other metal oxides | 7 | so treated was found to give a reflectance as based upon an arbitrary scale of approximately 2.2. The same glass without treatment gave a reflectance upon the same scale of approximately 6.2.

The results obtained by treating barium crown with nitric acid of 0.5 normality for varying periods and then treating it with hydrofluoric acid, in order to open up the pores of the skeleton film of silica produced by the first acid, are graphically depicted in Fig. 1 in which reflectometer readings are depicted upon an arbitrary scale as ordinates, while time in seconds of treatment with nitric acid is given as abscissa. The curve 1 is that obtained by treating the glass with nitric acid alone for varying periods of time. The curve 2 is that obtained by treating the glass with nitric acid followed by a thirty second treatment with hydrofluoric acid in order to open up the skeleton of silica resulting from the nitric acid treatment; curve 3 is that obtained by treating the barium crown glass with hydrofluoric acid for a period of 60 seconds after it had been treated with nitric acid for the periods indicated by the curve.

In these tests dilute hydrofluoric acid obtained by adding 2.5 c. c. of 48% hydrofluoric acid to 900 c. c. of distilled water. Any other concentration within reasonable limits e. g. ½ to 50 c. c. more or less of 48% acid per liter of water may be employed. Temperatures of treatment with hydrofluoric may vary over considerable range, e. g. 5 to 85° C. but normal room temperature is a good average.

Samples of so-called "X-Ray" glass comprising: $SiO_2$—30%, PbO—62%, BaO—8%, were treated in similar manner. Since this glass is less sensitive to acid etching than the barium crown, longer periods of etching were required. The results of the treatments are depicted graphically in Fig. 2 in which curve 5 is that obtained by use of nitric acid alone. The remaining curves 6 to 10 inclusive are those resulting from preliminary treatment with nitric acid followed by treatment with hydrofluoric acid respectively for periods of 30 seconds, 1 minute, 2 minutes, 3 minutes and 5 minutes.

It is to be observed that upon thin films resulting from slight treatment with nitric acid, the hydrofluoric acid acts to increase reflectance. This apparently is due to partial or complete eating away of the silica in the film by the hydrochloric acid. However, the application of hydrofluoric acid to the more deeply etched films, e. g. those resulting from treatment of the glass with nitric acid until after indigo coloration had been reached and passed, resulted in lowering of reflectance. The minimum of reflectance obtained by the double treatment was substantially less than that obtainable by use of nitric acid alone.

The difference is attributable to the removal of silica from the interior of the porous film resulting from the removal of alkali and other more soluble constituents from the glass by nitric acid.

The use of other strong acids, such as hydrochloric, sulfuric, etc. in place of nitric acid, in order to preliminarily form a film upon the glass, is contemplated. The acid, however, should be relatively non-reactive with respect to silica.

The use of hydrofluoric acid by itself is not contemplated, because it will tend to eat away the surface without forming a porous skeleton, and if substantially prolonged gives a frosted effect.

The forms of the invention herein described are merely exemplary. Numerous modifications may be made therein without departure from the spirit of the invention or the scope of the claims.

What I claim is:

1. A process of forming non-reflecting films upon a surface of a glass body comprising silica and base components for the silica, which process comprises leaching out the base components from the surface of the glass while leaving the silica in place to form a film consisting primarily of silica, the degree of leaching being such that the thickness of the silica film is slightly greater than one-quarter wave length of light, then treating the silica film with hydrofluoric acid until approximate minimum reflectance is obtained.

2. A process of forming non-reflective films upon the surface of a body of glass comprising silica and base components, which process comprises first treating the glass with a strong mineral acid that removes the base components from the surface without substantially attacking the silica, to form a thin film of silica of a thickness somewhat greater than one-quarter of the wave length of light for a predetermined portion of the light spectrum, then further treating the film with hydrofluoric acid to etch away some of the silica and provide a film of desired thickness.

3. A process of forming non-reflecting films of high durability to mechanical wear upon a surface of a body of glass comprising silica and base components, which process comprises first leaching the surface of the glass with a strong mineral acid that removes base components, without correspondingly attacking the silica until a film enriched in silica and of a thickness slightly greater than required for minimum reflection is formed, then contacting the film with hydrofluoric acid to leach out silica, the leaching operation being continued until minimum reflection to light of predetermined wave length is obtained.

4. A process as defined in claim 2 in which the strong mineral acid is nitric acid.

FREDERICK W. ADAMS.